US012696215B2

(12) United States Patent
Wang et al.

(10) Patent No.: US 12,696,215 B2
(45) Date of Patent: Jul. 28, 2026

(54) METHOD AND APPARATUS FOR DETERMINING TRANSMISSION DELAY, DEVICE, AND STORAGE MEDIUM

(71) Applicant: VIVO MOBILE COMMUNICATION CO., LTD., Dongguan (CN)

(72) Inventors: Wen Wang, Dongguan (CN); Xiaowan Ke, Dongguan (CN); Xiaodong Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 166 days.

(21) Appl. No.: 18/216,529

(22) Filed: Jun. 29, 2023

(65) Prior Publication Data

US 2023/0354237 A1 Nov. 2, 2023

Related U.S. Application Data

(63) Continuation of application No. PCT/CN2021/141225, filed on Dec. 24, 2021.

(30) Foreign Application Priority Data

Dec. 31, 2020 (CN) .......................... 202011635552.1

(51) Int. Cl.
*H04W 56/00* (2009.01)
(52) U.S. Cl.
CPC ............................... *H04W 56/0055* (2013.01)
(58) Field of Classification Search
CPC ............... H04W 40/12; H04W 28/284; H04W 28/0236; H04W 24/10; H04W 24/08; H04W 56/00; H04W 56/0055; H04L 67/101; H04L 47/83; H04L 47/127;

(Continued)

(56) References Cited

U.S. PATENT DOCUMENTS

2006/0155984 A1* 7/2006 Tsuchida ............. H04L 41/0856
713/156
2012/0269172 A1* 10/2012 Chin ................... H04W 36/326
370/332
2016/0241680 A1* 8/2016 Cho ........................ H04L 69/18

(Continued)

FOREIGN PATENT DOCUMENTS

CN 109673021 A 4/2019
CN 111679905 A 9/2020

(Continued)

OTHER PUBLICATIONS

International Search Report issued in corresponding International Application No. PCT/CN2021/141225, mailed Mar. 1, 2022, 4 pages.

(Continued)

*Primary Examiner* — Stephen J Clawson
(74) *Attorney, Agent, or Firm* — IPX PLLC

(57) ABSTRACT

A method and an apparatus for determining a transmission delay, a device, and a storage medium are provided. The method includes: obtaining first information; and determining a first delay based on the first information. The first information includes an internal processing delay of a server or a server processing resource, and the first delay includes a delay between a terminal and a gateway.

16 Claims, 7 Drawing Sheets

Obtain first information, where the first information includes: an internal processing delay of a server or a server processing resource ⟶ 200

Determine a first delay based on the first information, where the first delay includes: a delay between a terminal and a gateway ⟶ 201

(58) Field of Classification Search
CPC ... H04L 47/11; H04L 45/121; H04L 43/0858;
H04L 43/12
See application file for complete search history.

(56) References Cited

U.S. PATENT DOCUMENTS

| | | | | |
|---|---|---|---|---|
| 2020/0322836 | A1* | 10/2020 | Lekutai | H04W 28/0236 |
| 2021/0136142 | A1* | 5/2021 | Dong | G06F 9/5094 |
| 2021/0226902 | A1* | 7/2021 | Li | H04L 41/0895 |
| 2021/0297893 | A1* | 9/2021 | Hallenstål | H04W 80/04 |
| 2021/0368331 | A1* | 11/2021 | Ke | H04B 17/364 |
| 2022/0070071 | A1* | 3/2022 | Poe | H04L 43/20 |
| 2023/0013712 | A1* | 1/2023 | Maheshwari | H04L 1/08 |

FOREIGN PATENT DOCUMENTS

| | | |
|---|---|---|
| CN | 111866775 A | 10/2020 |
| CN | 112003660 A | 11/2020 |

OTHER PUBLICATIONS

Zening Liu et al, "Cost Aware Task Scheduling in Multi-Tier Computing Networks" Journal of Computer Research and Development, Sep. 1, 2020, 57(9): 1810-1822.
First Office Action issued in related Chinese Application No. 202011635552.1, mailed May 16, 2023, 8 pages.

* cited by examiner

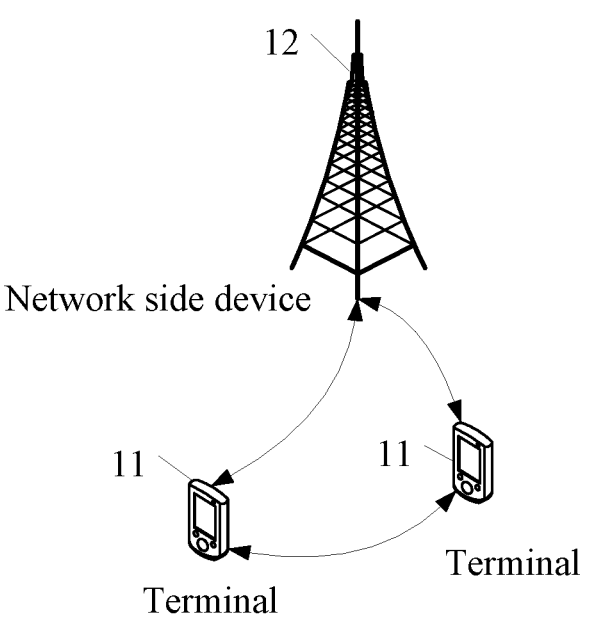

Network side device

Terminal

Terminal

FIG. 1

| Obtain first information, where the first information includes: an internal processing delay of a server or a server processing resource | 200 |

| Determine a first delay based on the first information, where the first delay includes: a delay between a terminal and a gateway | 201 |

FIG. 2

Start

| Sending first information, where the first information includes: an internal processing delay of a server or a server processing resource | 300 |

End

FIG. 3

METHOD AND APPARATUS FOR DETERMINING TRANSMISSION DELAY, DEVICE, AND STORAGE MEDIUM

CROSS-REFERENCE TO RELATED APPLICATIONS

This application is a continuation of International Application No. PCT/CN2021/141225, filed Dec. 24, 2021, which claims priority to Chinese Patent Application No. 202011635552.1, filed Dec. 31, 2020. The entire contents of each of the above-referenced applications are expressly incorporated herein by reference.

TECHNICAL FIELD

This application relates to the field of communications technologies, and in particular, to a method and an apparatus for determining a transmission delay, a device, and a storage medium.

BACKGROUND

To satisfy service experience of a user, an end-to-end delay requirement of a service is an important indicator to satisfy. Because an end-to-end delay requirement of a terminal (also known as User Equipment (UE)) service in the prior art usually considers only a delay between UE and a gateway, that is, it is considered that if the delay between UE and a gateway is satisfied, the end-to-end delay requirement of the service is satisfied, an internal processing delay of a terminal, an internal processing delay of a server, and the like are ignored. In the context of a computing first network or a next-generation network that evolves later, in order to finely formulate corresponding policies or allocate corresponding resources to satisfy a transmission delay requirement in a mobile communication network, the network needs to consider factors other than a delay between a terminal and a gateway that affect an end-to-end delay requirement.

However, there is currently no feasible solution for obtaining factors other than the delay between the terminal and the gateway that affect the end-to-end delay requirement and further determining a transmission delay in the context of the computing first network or the next-generation network that evolves later.

SUMMARY

Embodiments of this application provide a method and an apparatus for determining a transmission delay, a device, and a storage medium.

According to a first aspect, a method for determining a transmission delay is provided and is applied to a first communications device, and the method includes:

obtaining first information; and determining a first delay based on the first information, where the first information includes: an internal processing delay of a server or a server processing resource; and the first delay includes: a delay between a terminal and a gateway.

According to a second aspect, a method for determining a transmission delay is provided and is applied to a server, and the method includes:

sending first information, where the first information includes: an internal processing delay of a server or a server processing resource.

According to a third aspect, a method for determining a transmission delay is provided and is applied to a terminal, and the method includes:

sending an internal processing delay of a terminal.

According to a fourth aspect, a method for determining a transmission delay is provided and is applied to a gateway, and the method includes:

sending a delay between a gateway and a server.

According to a fifth aspect, an apparatus for determining a transmission delay is provided and is applied to a first communications device, and the apparatus includes:

a first obtaining unit, configured to obtain first information; and a first determining unit, configured to determine a first delay based on the first information, where the first information includes: an internal processing delay of a server or a server processing resource; and the first delay includes: a delay between a terminal and a gateway.

According to a sixth aspect, an apparatus for determining a transmission delay is provided and is applied to a server, and the apparatus includes:

a first sending unit, configured to send first information, where the first information includes: an internal processing delay of a server or a server processing resource.

According to a seventh aspect, an apparatus for determining a transmission delay is provided and is applied to a terminal, and the apparatus includes:

a second sending unit, configured to send an internal processing delay of a terminal.

According to an eighth aspect, an apparatus for determining a transmission delay is provided and is applied to a gateway, and the apparatus includes:

a third sending unit, configured to send a delay between a gateway and a server.

According to a ninth aspect, a network side device is provided. The network side device includes a processor, a memory, and a program or an instruction that is stored in the memory and that can be run on the processor, where when the program or the instruction is executed by the processor, the steps of the method in the first aspect, the second aspect, or the fourth aspect are implemented.

According to a tenth aspect, a terminal is provided. The terminal includes a processor, a memory, and a program or an instruction that is stored in the memory and that can be run on the processor, where when the program or the instruction is executed by the processor, the steps of the method in the third aspect are implemented.

According to an eleventh aspect, a readable storage medium is provided. The readable storage medium stores a program or an instruction, and when the program or the instruction is executed by a processor, the steps of the method in the first aspect are implemented, or the steps of the method in the second aspect are implemented, or the steps of the method in the third aspect are implemented, or the steps of the method in the fourth aspect are implemented.

According to a twelfth aspect, a chip is provided, the chip includes a processor and a communications interface, the communications interface is coupled to the processor, and the processor is used to run a program or an instruction to implement the method in the first aspect, or implement the method in the second aspect, or implement the method in the third aspect, or implement the method in the fourth aspect.

According to a thirteenth aspect, an embodiment of this application provides a program product, the program product is stored in a non-volatile storage medium, and the program product is executed by at least one processor to implement the method in the first aspect, or implement the method in the second aspect, or implement the method in the third aspect, or implement the method in the fourth aspect.

According to a fourteenth aspect, an embodiment of this application provides a communications device, configured to perform the method in the first aspect, or configured to perform the method in the second aspect, or configured to perform the method in the third aspect, or configured to perform the method in the fourth aspect.

In the embodiments of this application, the first communications device obtains the internal processing delay of the server or the server processing resource, and determines a transmission delay in a mobile communication network based on the internal processing delay of the server or the server processing resource, so as to provide policy formulation and resource allocation and scheduling in the mobile communication network, and better satisfy user experience or a computing power task requirement of UE.

BRIEF DESCRIPTION OF DRAWINGS

FIG. 1 is a block diagram of a wireless communication system to which an embodiment of this application is applicable;

FIG. 2 is a first flowchart of a method for determining a transmission delay according to an embodiment of this application;

FIG. 3 is a second flowchart of a method for determining a transmission delay according to an embodiment of this application;

DETAILED DESCRIPTION

Figure 4:
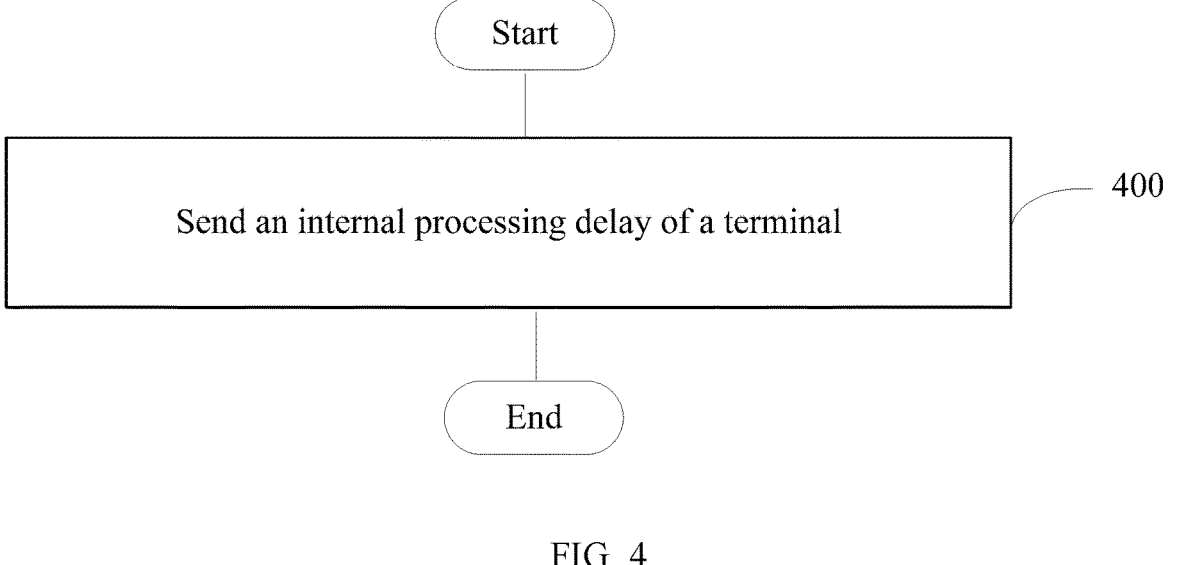
FIG. 4 is a third flowchart of a method for determining a transmission delay according to an embodiment of this application.

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

Terms "first" and "second" in the specification and claims of this application are used to distinguish between similar objects, and do not need to be used to describe a specific order or sequence. It should be understood that, data termed in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, a New Radio (NR) system is described in the following descriptions for illustrative purposes, and the NR terminology is used in most of the following descriptions, although these techniques can also be applied to applications other than the NR system application, for example, the 6th Generation (6G) communications system.

FIG. 1 is a block diagram of a wireless communications system to which an embodiment of this application can be applied. The wireless communications system includes a terminal 11 and a network side device 12. The terminal 11 may be referred to as a terminal device or UE. The terminal 11 may be a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, vehicle user equipment (VUE), and pedestrian user equipment (PUE). The wearable device includes a bracelet, a headset, and glasses. It should be noted that a specific type of the terminal 11 is not limited in the embodiments of this application. The network side device 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a Wireless Local Area Network (WLAN) access point, a Wi-Fi node, a Transmitting Receiving Point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

A Computing First Network (CFN) is an exploration of a new architecture, a new protocol, and a new technology for computing and network integration: A thin layer of the CFN located above a network layer releases a current computing performance status and network status as routing information to the network, and the network routes a computing task packet to a corresponding computing node to achieve optimal user experience, optimal utilization of computing resources, and optimal network efficiency. Through an ability of dynamic routing of computing tasks built into the computing first network, according to service needs, based on real-time computing resource performance, network performance, costs, and other multi-dimensional factors, computing tasks are dynamically and flexibly scheduled, thereby improving resource utilization and network utilization efficiency, and improving user experience of a service. For an edge computing scenario, edge computing can be networked through the computing first network to implement edge-to-edge collaboration, and multi-instance and multi-copy features of a service are used to implement nearby access of users and load balancing of the service to resolve problems such as complex deployment, low efficiency, and a low resource reuse rate, and facilitate scale deployment of edge computing.

In the context of the computing first network or a next-generation network that evolves later, end-to-end delay consideration needs to be further expanded to achieve more fine-grained control. A mobile communication network needs to know a processing delay of UE for a computing power task, a processing delay of a computing power server, and a transmission delay between a gateway and the computing power server, so that policy formulation and resource allocation and scheduling can be provided in the mobile communication network, to satisfy a transmission delay requirement in the mobile communication network. There is currently no feasible solution for determining a transmission delay in the context of the computing first network or the next-generation network that evolves later.

A method for determining a transmission delay provided in the embodiments of this application is described in detail below with reference to the accompanying drawings by using specific embodiments and application scenarios thereof.

In some embodiments, obtaining may be understood as obtaining from a configuration, receiving, receiving through a request, obtaining through self-learning, deriving from unreceived information, or obtaining after processing based on received information. This may be determined based on an actual requirement, and is not limited in the embodiments of this application. For example, when indication information of a capability sent by a device is not received, it may be deduced that the device does not support the capability.

In some embodiments, sending may include broadcasting, broadcasting in a system message, and returning after responding to a request.

In this embodiment of this application, computing power includes a computing speed or computing performance. For example, a computing speed or computing performance of a server, a Central Processing Unit (CPU), a Graphics Processing Unit (GPU), a terminal, or the like is usually expressed by a quantity of times that calculations are completed per second.

A computing power requirement includes computing power resources required to complete a computing power task.

A computing task includes work to be completed that require a specific amount of computing power.

A computing power status includes a computing power usage status, a computing power remaining status, or a computing power availability status, for example, a computing power usage status, or a computing power availability status, or a computing power remaining status of a device such as a server, a terminal, a CPU, or a GPU; the computing power remaining status or the computing power availability status may be available computing power; and the computing power usage status may be a computing power usage rate.

In some embodiments, computing power may be represented by at least one of the following:

floating point operations per second (flops);

a quantity of cores of a processor;

Multiply Accumulate (MAC);

a quantity of cores of a graphics processing unit;

a clock speed of a processor/a graphics processing unit;

a clock multiplier of a processor/a graphics processing unit;

an integer unit of a processor/a graphics processing unit;

a floating point unit of a processor/a graphics processing unit; or a speed at which an output of a hash function is calculated.

FIG. 2 is a first schematic flowchart of a method for determining a transmission delay according to an embodiment of this application. The method is applied to a first communications device.

In this embodiment of this application, the first communications device may be an Application Function (AF) network element, a computing-aware network element (including a server-type network element), a Network Data Analytics Function (NWDAF) network element, a Policy Control function (PCF) network element, or other new functions or devices used to determine the transmission delay in an evolved network.

As shown in FIG. 2, the method includes the following steps:

Step 200: Obtain first information.

The first communications device obtains the first information, where the first information includes: an internal processing delay of a server or a server processing resource.

In an implementation, the server includes one of the following:

a computing power server, where the computing power server includes a server capable of providing computing resources and/or computing performance;

an Edge Application Server (EAS);

an application server;

a computing resource server;

a computing performance server;

an edge computing resource server;

an edge computing performance server; or an edge computing power server.

In an implementation, the computing power task and/or service is initiated by a terminal.

Step 201: Determine a first delay based on the first information.

The first communications device determines the first delay based on the first information, the first delay is a transmission delay in a mobile communication network, and the first delay includes: a delay between a terminal and a gateway.

In an implementation, the gateway includes a User Plane Function (UPF) network element in the mobile communication network, such as a Protocol Data Unit (PDU) session anchor (PDU session anchor, PSA) or a Public Data Network (PDN) gateway (PDN GateWay, PGW).

In an implementation, the gateway is an anchor gateway.

In some embodiments, the determining a first delay based on the first information includes:

calculating the first delay based on the internal processing delay of the server, a total delay for a service or computing power task requirement, an internal processing delay of a terminal, and a delay between a gateway and a server.

In some embodiments, the first delay is calculated by using the following formula:

$$t1 = T - t2 - t3 - t4, \text{ where}$$

t1 is the first delay, T is the total delay for a service or computing power task requirement, t2 is the delay between the gateway and the server, t3 is the internal processing delay of the server, and t4 is the internal processing delay of the terminal.

In this embodiment of this application, the first communications device obtains the internal processing delay of the server or the server processing resource, and determines the transmission delay in the mobile communication network based on the internal processing delay of the server or the server processing resource, so that policy formulation and resource allocation and scheduling can be provided in the mobile communication network, and user experience or a computing power task requirement of UE can be better satisfied.

In some embodiments, the obtaining first information includes:

sending a first request, where the first request is used to request the internal processing delay of the server or the server processing resource; and receiving a response message for the first request, where the response message for the first request includes: the internal processing delay of the server or the server processing resource, where the first communications device may obtain the internal processing delay of the server or the server processing resource by sending the first request to a server and receiving the response message for the first request; and the first request includes at least one of the following:

a terminal identifier;

an identifier of either a service or computing power task;

description information of either a service or computing power task; or description information of a resource required for either a service or computing power task.

In an implementation, the terminal identifier may be an application layer identifier, a user identifier of the terminal, or a device identifier of the terminal.

In an implementation, the identifier of either a service or computing power task may be an ID (Identifier) of a service or computing power task.

In an implementation, the description information of either a service or computing power task includes at least one of the following:

a computing power task ID and/or service ID, a Fully Qualified Domain Name (FQDN), a source IP address, a destination IP address, a source port, a destination port, a protocol number, a source Media Access Control (MAC) address, a destination MAC address identifier, a packet detection rule (PDR), a Data Network Name (DNN), and application descriptors (including an operating system identifier (OSid), and/or an operating system application identifier (OSAppid)).

In an implementation, the description information of a resource required for either a service or computing power task includes at least one of the following: a service or computing power task delay requirement, a bit error rate, or user experience.

In this embodiment of this application, the first communications device obtains the internal processing delay of the server or the server processing resource by sending the first request, and then determines the delay between the terminal and the gateway based on the internal processing delay of the server, so that a corresponding policy may be formulated or corresponding resources may be allocated to satisfy a required delay requirement, improve UE user experience, and better satisfy a computing power task requirement.

In some embodiments, the first request further includes: an internal processing delay subscription event of the server, and the internal processing delay subscription event of the server includes at least one of the following:

the internal processing delay of the server being changed;

a processing resource for a service or computing power task being changed;

a reporting threshold for the internal processing delay of the server;

a reporting time period for the internal processing delay of the server; or the server being changed.

In some embodiments, the first request sent by the first communications device to the server further includes an internal processing delay subscription event of the server.

In an implementation, when the internal processing delay of the server changes, the server sends a current internal processing delay of the server to the first communications device.

In an implementation, when the processing resource for a service or computing power task changes, the server sends a current internal processing delay or processing resource of the server to the first communications device.

In an implementation, when the internal processing delay of the server reaches the reporting threshold, the server sends a current internal processing delay of the server to the first communications device.

In an implementation, when the internal processing delay of the server satisfies the reporting time threshold, the server sends a current internal processing delay of the server to the first communications device.

In an implementation, when the server is changed, the server sends a current internal processing delay of the server to the first communications device.

In this embodiment of this application, the first communications device obtains the internal processing delay of the server or the server processing resource by sending the internal processing delay subscription event of the server, and then determines the delay between the terminal and the gateway based on the internal processing delay of the server or the server processing resource, so that a corresponding policy may be formulated or corresponding resources may be allocated to satisfy a required delay requirement, improve UE user experience, and better satisfy a computing power task requirement.

In some embodiments, when the first information includes the server processing resource, the internal processing delay of the server is determined based on the server processing resource.

It may be understood that, when the first information obtained by the first communications device includes the server processing resource, the first communications device calculates the internal processing delay of the server based on the server processing resource.

In some embodiments, the method for determining a transmission delay further includes:

obtaining second information.

In some embodiments, to determine the first delay, the first communications device further needs to obtain the second information on the basis of obtaining the first information, where the second information includes at least one of the following:

a total delay for a service or computing power task requirement;

an internal processing delay of a terminal; or a delay between a gateway and a server.

Further, the determining a first delay based on the first information includes:

determining the first delay based on the second information and the first information.

In an implementation, the determining the first delay based on the second information and the first information includes:

calculating the first delay based on the internal processing delay of the server, a total delay for a service or computing power task requirement, an internal processing delay of a terminal, and a delay between a gateway and a server.

In some embodiments, the first delay is calculated by using the following formula:

$$t1 = T - t2 - t3 - t4, \text{ where}$$

t1 is the first delay, T is the total delay for a service or computing power task requirement, t2 is the delay between the gateway and the server, t3 is the internal processing delay of the server, and t4 is the internal processing delay of the terminal.

In this embodiment of this application, the first communications device obtains at least one of the internal processing delay of the server or the server processing resource, the total delay for a service or computing power task requirement, the internal processing delay of the terminal, and the delay between the gateway and the server by obtaining the first information and the second information, to determine the delay between the terminal and the gateway, so that a corresponding policy is formulated or corresponding resources are allocated to satisfy a required delay requirement, improve UE user experience, and better satisfy a computing power task requirement.

In some embodiments, when the second information includes the internal processing delay of the terminal, the obtaining second information includes:

sending a second request, where the second request is used to obtain the internal processing delay of the terminal; and receiving a response message for the second request, where the response message for the second request includes the internal processing delay of the terminal.

In some embodiments, the first communications device may send the second request to the terminal, so that the terminal returns the response message for the second request to the first communications device according to the second request, and the first communications device receives the response message for the second request, thereby obtaining the internal processing delay of the terminal.

The second request includes one of the following:

a terminal identifier;

a protocol data unit (PDU) session identifier; or an identifier of either a service or computing power task.

In an implementation, the terminal identifier may be an application layer identifier, a user identifier of the terminal, or a device identifier of the terminal.

In an implementation, the identifier of either a service or computing power task may be an ID of a service or computing power task.

In this embodiment of this application, the first communications device obtains the internal processing delay of the terminal by sending the second request, and determines the delay between the terminal and the gateway based on the internal processing delay of the terminal, so that a corresponding policy may be formulated or corresponding resources may be allocated to satisfy a required delay requirement, improve UE user experience, and better satisfy a computing power task requirement.

In some embodiments, the second request further includes: an internal processing delay subscription event of the terminal, and the internal processing delay subscription event of the terminal includes at least one of the following:

the internal processing delay of the terminal being changed;

a reporting threshold for the internal processing delay of the terminal; or a reporting time period for the internal processing delay of the terminal.

In some embodiments, the second request sent by the first communications device may further include an internal processing delay subscription event of the terminal.

In some embodiments, the first communications device sends the internal processing delay subscription event of the terminal to the terminal.

In an implementation, when the internal processing delay of the terminal changes, the terminal sends a current internal processing delay of the terminal to the first communications device.

In an implementation, when the internal processing delay of the terminal reaches the reporting threshold, the terminal sends a current internal processing delay of the terminal to the first communications device.

In an implementation, when the internal processing delay of the terminal satisfies the reporting time threshold, the terminal sends a current internal processing delay of the terminal to the first communications device.

In this embodiment of this application, the first communications device obtains the internal processing delay of the terminal by sending the internal processing delay subscription event of the terminal, and then determines the delay between the terminal and the gateway based on the internal processing delay of the terminal, so that a corresponding policy may be formulated or corresponding resources may be allocated to satisfy a required delay requirement, improve UE user experience, and better satisfy a computing power task requirement.

In some embodiments, when the second information includes the delay between the gateway and the server, the obtaining second information includes:

sending a third request, where the third request is used to request the delay between the gateway and the server; and receiving a response message for the third request, where the response message for the third request includes the delay between the gateway and the server, where the third request includes one of the following:

a terminal identifier;

a PDU session identifier; or an identifier of either a service or computing power task.

In some embodiments, the first communications device may send the third request to the gateway, so that the gateway sends the response message for the third request to the first communications device based on the third request, and the first communications device receives the response message for the third request, thereby obtaining the delay between the gateway and the server.

The delay between the gateway and the server may be an N6 delay.

In an implementation, the terminal identifier may be an application layer identifier, a user identifier of the terminal, or a device identifier of the terminal.

In an implementation, the identifier of either a service or computing power task may be an ID of a service or computing power task.

In this embodiment of this application, the first communications device obtains the delay between the gateway and the server by sending the third request, and determines the delay between the terminal and the gateway based on the delay between the gateway and the server, so that a corresponding policy may be formulated or corresponding resources may be allocated to satisfy a required delay requirement, improve UE user experience, and better satisfy a computing power task requirement.

In some embodiments, the third request further includes:

a delay subscription event between the gateway and the server, where the delay subscription event between the gateway and the server includes at least one of the following:

the delay between the gateway and the server being changed;

a reporting threshold for the delay between the gateway and the server;

a reporting time period for the delay between the gateway and the server; or the gateway being changed.

In some embodiments, the first communications device may obtain the delay between the gateway and the server by sending the delay subscription event between the gateway and the server to the gateway.

In an implementation, when the delay between the gateway and the server is changed, the gateway sends a current delay between the gateway and the server to the first communications device.

In an implementation, when the delay between the gateway and the server reaches the reporting threshold, the gateway sends a current delay between the gateway and the server to the first communications device.

In an implementation, when the delay between the gateway and the server satisfies the reporting time threshold, the gateway sends a current delay between the gateway and the server to the first communications device.

In an implementation, when the gateway is changed, the gateway sends a current delay between the gateway and the server to the first communications device.

In this embodiment of this application, the first communications device obtains the delay between the gateway and the server by sending the delay subscription event between the gateway and the server, and then determines the delay between the terminal and the gateway based on the delay between the gateway and the server, so that a corresponding policy may be formulated or corresponding resources may be allocated to satisfy a required delay requirement, improve UE user experience, and better satisfy a computing power task requirement.

FIG. 3 is a second schematic flowchart of a method for determining a transmission delay according to an embodiment of this application. The method is applied to a server, and the server includes one of the following:

a computing power server, where the computing power server includes a server capable of providing computing resources and/or computing performance;

an Edge Application Server (EAS);

an application server;

a computing resource server;

a computing performance server;

an edge computing resource server;

an edge computing performance server; or an edge computing power server.

As shown in FIG. 3, the method includes the following steps:

Step 300: Send first information, where the first information includes: an internal processing delay of a server or a server processing resource.

In some embodiments, the server sends the first information to a first communications device, where the first information includes an internal processing delay of a server or a server processing resource, so that the first communications device obtains the internal processing delay of the server.

In this embodiment of this application, the server sends the internal processing delay of the server or the server processing resource to the first communications device, and then the first communications device may determine the delay between the terminal and the gateway based on the internal processing delay of the server, so that a corresponding policy is formulated or corresponding resources is allocated to satisfy a required delay requirement, improve UE user experience, and better satisfy a computing power task requirement.

In some embodiments, before the sending first information, the method further includes:

receiving a first request, where the first request is used to obtain the internal processing delay of the server or the server processing resource.

In an implementation, after receiving the first request sent by the first communications device, the server sends a response message for the first request to the first communications device according to the first request, and the response message for the first request includes: the internal processing delay of the server or the server processing resource, where the first request includes at least one of the following:

a terminal identifier;

an identifier of either a service or computing power task;

description information of either a service or computing power task;

description information of a resource required for either a service or computing power task; or an internal processing delay subscription event of the server.

In an implementation, the terminal identifier may be an application layer identifier, a user identifier of the terminal, or a device identifier of the terminal.

In an implementation, the identifier of either a service or computing power task may be an ID (Identifier) of a service or computing power task.

In an implementation, the description information of either a service or computing power task includes at least one of the following:

a computing power task ID and/or service ID, a fully qualified domain name FQDN, a source IP address, a destination IP address, a source port, a destination port, a protocol number, a source MAC address, a destination MAC address identifier, a packet detection rule PDR, a data network name DNN, or application descriptors (including an OSid and/or an OSAppid).

In an implementation, the description information of a resource required for either a service or computing power task includes at least one of the following: a service or computing power task delay requirement, a bit error rate, or user experience.

In an implementation, the first communications device sends the internal processing delay subscription event of the server to the server, the server receives the internal processing delay subscription event of the server, and in a case that the internal processing delay subscription event of the server occurs or is implemented, the server sends the internal processing delay of the server to the first communications device.

In some embodiments, the internal processing delay subscription event of the server includes at least one of the following:

the internal processing delay of the server being changed;

a processing resource for a service or computing power task being changed;

a reporting threshold for the internal processing delay of the server;

a reporting time period for the internal processing delay of the server; or the server being changed.

In some embodiments, before the sending first information, the method further includes:

determining, based on the internal processing delay subscription event of the server, whether to send the first information.

In an implementation, when the internal processing delay of the server changes, the server determines to send a current internal processing delay of the server to the first communications device.

In an implementation, when the processing resource for a service or computing power task changes, the server determines to send a current internal processing delay or processing resource of the server to the first communications device.

In an implementation, when the internal processing delay of the server reaches the reporting threshold, the server determines to send a current internal processing delay of the server to the first communications device.

In an implementation, when the internal processing delay of the server satisfies the reporting time threshold, the server determines to send a current internal processing delay of the server to the first communications device.

In an implementation, when the server is changed, the server determines to send a current internal processing delay of the server to the first communications device.

In this embodiment of this application, the server receives the first request sent by the first communications device, and sends the internal processing delay of the server or the server processing resource to the first communications device according to the first request, and then the first communications device may determine the delay between the terminal and the gateway based on the internal processing delay of the server, so that a corresponding policy is formulated or corresponding resources is allocated to satisfy a required delay requirement, improve UE user experience, and better satisfy a computing power task requirement.

FIG. 4 is a third schematic flowchart of a method for determining a transmission delay according to an embodiment of this application. The method is applied to a terminal. As shown in FIG. 4, the method includes the following steps:

Step 400: Send an internal processing delay of a terminal.

In some embodiments, the terminal sends the internal processing delay of the terminal to a first communications device, so that the first communications device obtains the internal processing delay of the terminal.

In this embodiment of this application, the terminal directly sends the internal processing delay of the terminal to the first communications device, and then the first communications device may determine a transmission delay in the mobile communication network based on the internal processing delay of the terminal, so that a corresponding policy is formulated or corresponding resources is allocated to satisfy a required delay requirement, improve UE user experience, and better satisfy a computing power task requirement.

In some embodiments, before the sending an internal processing delay of a terminal, the method further includes:

receiving a second request, where the second request is used to obtain the internal processing delay of the terminal.

The terminal receives the second request sent by the first communications device, and sends the internal processing delay of the terminal according to the second request.

The second request includes one of the following:

a terminal identifier;

a protocol data unit PDU session identifier;

an identifier of either a service or computing power task; or an internal processing delay subscription event of the terminal.

In an implementation, the terminal identifier may be an application layer identifier, a user identifier of the terminal, or a device identifier of the terminal.

In an implementation, the identifier of either a service or computing power task may be an ID (Identifier) of a service or computing power task.

In an implementation, the description information of either a service or computing power task includes at least one of the following:

a computing power task ID and/or service ID, a fully qualified domain name FQDN, a source IP address, a destination IP address, a source port, a destination port, a protocol number, a source MAC address, a destination MAC address identifier, a packet detection rule PDR, a data network name DNN, or application descriptors (including an OSid and/or an OSAppid).

In an implementation, the description information of a resource required for either a service or computing power task includes at least one of the following: a service or computing power task delay requirement, a bit error rate, or user experience.

In an implementation, the terminal receives the internal processing delay subscription event of the terminal sent by the first communications device. The terminal receives the internal processing delay subscription event of the terminal, and in a case that the internal processing delay subscription event of the terminal occurs or is implemented, sends the internal processing delay of the terminal to the first communications device.

In some embodiments, the internal processing delay subscription event of the terminal includes at least one of the following:

the internal processing delay of the terminal being changed;

a reporting threshold for the internal processing delay of the terminal; or a reporting time period for the internal processing delay of the terminal.

In some embodiments, before the sending an internal processing delay of a terminal, the method further includes:

determining, based on the internal processing delay subscription event of the terminal, whether to send the internal processing delay of the terminal.

In an implementation, when the internal processing delay of the terminal changes, the terminal sends a current internal processing delay of the terminal to the first communications device.

In an implementation, when the internal processing delay of the terminal reaches the reporting threshold, the terminal sends a current internal processing delay of the terminal to the first communications device.

In an implementation, when the internal processing delay of the terminal satisfies the reporting time threshold, the terminal sends a current internal processing delay of the terminal to the first communications device.

In this embodiment of this application, the terminal receives the second request sent by the first communications device, and sends the internal processing delay of the terminal to the first communications device according to the second request, and then the first communications device may determine the delay between the terminal and the gateway based on the internal processing delay of the terminal, so that a corresponding policy is formulated or corresponding resources is allocated to satisfy a required delay requirement, improve UE user experience, and better satisfy a computing power task requirement.

Figure 5:
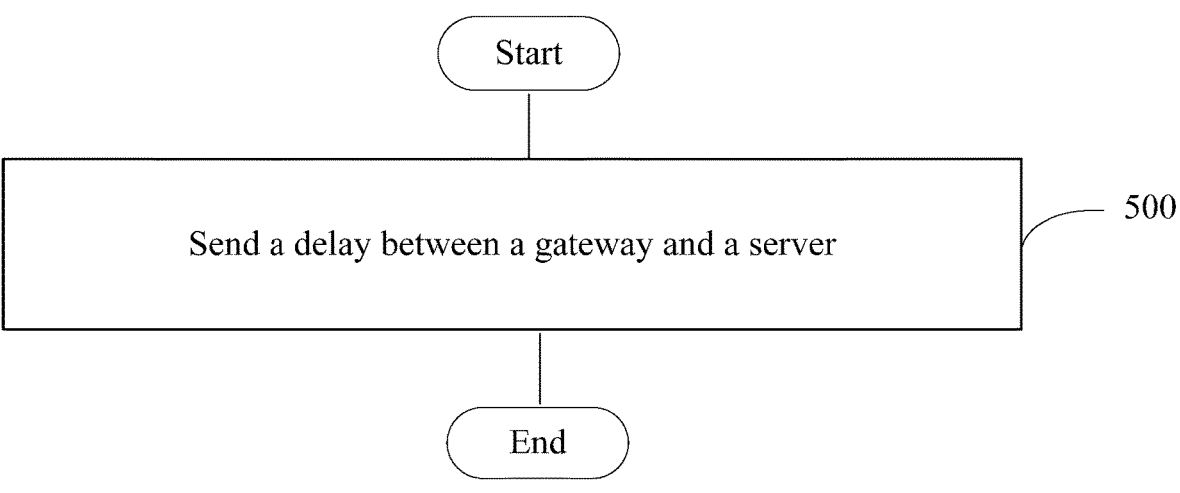
FIG. 5 is a fourth flowchart of a method for determining a transmission delay according to an embodiment of this application.

FIG. 5 is a fourth schematic flowchart of a method for determining a transmission delay according to an embodiment of this application. The method is applied to a gateway. In some embodiments, the gateway includes a user plane function UPF network element, such as a PSA or a PGW, in a mobile communication network. In an implementation, the gateway is an anchor gateway.

As shown in FIG. 5, the method includes the following steps:

Step 500: Send a delay between a gateway and a server.

In some embodiments, the gateway sends the delay between the gateway and the server to a first communications device.

The delay between the gateway and the server may be an N6 delay.

In this embodiment of this application, the gateway directly sends the delay between the gateway and the server to the first communications device, and then the first communications device may determine the delay between the terminal and the gateway based on the delay between the gateway and the server, so that a corresponding policy may be formulated or corresponding resources may be allocated to satisfy a required delay requirement, improve UE user experience, and better satisfy a computing power task requirement.

In some embodiments, before the sending a delay between a gateway and a server, the method further includes:

receiving a third request, where the third request is used to request the delay between the gateway and the server.

In some embodiments, the gateway receives the third request, and sends the delay between the gateway and the server to the first communications device according to the third request, where the third request includes one of the following:

a terminal identifier;

a protocol data unit PDU session identifier;

an identifier of either a service or computing power task; or a delay subscription event between the gateway and the server.

In an implementation, the gateway receives the delay subscription event between the gateway and the server that is sent by the first communications device. The gateway receives the delay subscription event between the gateway and the server, and in a case that the delay subscription event between the gateway and the server occurs or is implemented, sends the delay between the gateway and the server to the first communications device.

In some embodiments, the delay subscription event between the gateway and the server includes at least one of the following:

the delay between the gateway and the server being changed;

a reporting threshold for the delay between the gateway and the server;

a reporting time period for the delay between the gateway and the server; or the gateway being changed.

In some embodiments, before the sending a delay between a gateway and a server, the method further includes:

determining, based on the delay subscription event between the gateway and the server, whether to send the delay between the gateway and the server to the first communications device.

In an implementation, when the delay between the gateway and the server is changed, the gateway sends a current delay between the gateway and the server to the first communications device.

In an implementation, when the delay between the gateway and the server reaches the reporting threshold, the gateway sends a current delay between the gateway and the server to the first communications device.

In an implementation, when the delay between the gateway and the server satisfies the reporting time threshold, the gateway sends a current delay between the gateway and the server to the first communications device.

In an implementation, when the gateway is changed, the gateway sends a current delay between the gateway and the server to the first communications device.

In this embodiment of this application, the gateway receives the third request sent by the first communications device, and sends the delay between the gateway and the server to the first communications device according to the third request, and then the first communications device may determine the delay between the terminal and the gateway based on the delay between the gateway and the server, so that a corresponding policy may be formulated or corresponding resources may be allocated to satisfy a required delay requirement, improve UE user experience, and better satisfy a computing power task requirement.

Figure 6:
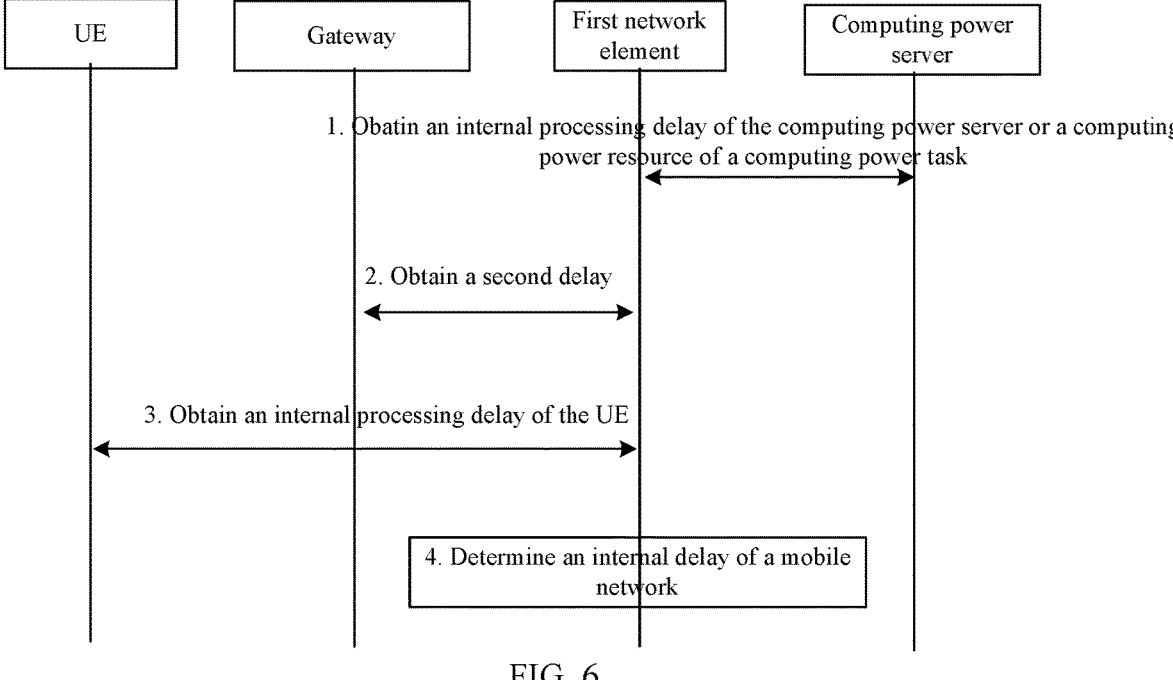
FIG. 6 is a fifth flowchart of a method for determining a transmission delay according to an embodiment of this application.

FIG. 6 is a fifth schematic flowchart of a method for determining a transmission delay according to an embodiment of this application. As shown in FIG. 6, the method includes the following steps:

Step 1: A first network element obtains an internal processing delay of a server or a server processing resource.

It should be noted that the first network element is the first communications device in the foregoing embodiments.

In an implementation, the first network element receives an internal processing delay of a computing power server or a processing resource of the computing power server that is sent by the computing power server.

In an implementation, the first network element sends a first request to the computing power server, and the first request is used to request the internal processing delay of the computing power server or the processing resource of the computing power server; and the first network element receives a response message for the first request returned by the computing power server, and the response message for the first request includes the internal processing delay of the computing power server or the processing resource of the computing power server.

Step 2: The first network element obtains a second delay, and the second delay includes a delay between a gateway and the computing power server.

In an implementation, the first network element receives the delay between the gateway and the computing power server sent by the gateway.

In an implementation, the first network element sends a third request to the gateway, and the third request is used to request the delay between the gateway and the computing power server; and the first network element receives a response message for the third request returned by the gateway, and the response message for the third request includes the delay between the gateway and the computing power server.

Step 3: The first network element obtains an internal processing delay of UE.

In an implementation, the first network element receives the internal processing delay of the terminal sent by the terminal.

In an implementation, the first network element sends a second request to the terminal, and the second request is used to request the internal processing delay of the terminal; and the first network element receives a response message for the second request returned by the terminal, and the response message for the second request includes the internal processing delay of the terminal.

Step 4: The first network element performs an operation of determining a first delay, and the first delay includes a delay between the terminal and the gateway.

The first delay is calculated by using the following formula based on the internal processing delay of the computing power server, a total delay for a service or computing power task requirement, the internal processing delay of the terminal, and the delay between the gateway and the computing power server:

$$t1 = T - t2 - t3 - t4, \text{ where}$$

t1 is the first delay, T is the total delay for a service or computing power task requirement, t2 is the delay between the gateway and the server, t3 is the internal processing delay of the server, and t4 is the internal processing delay of the terminal.

Figures 7, 8, 9:
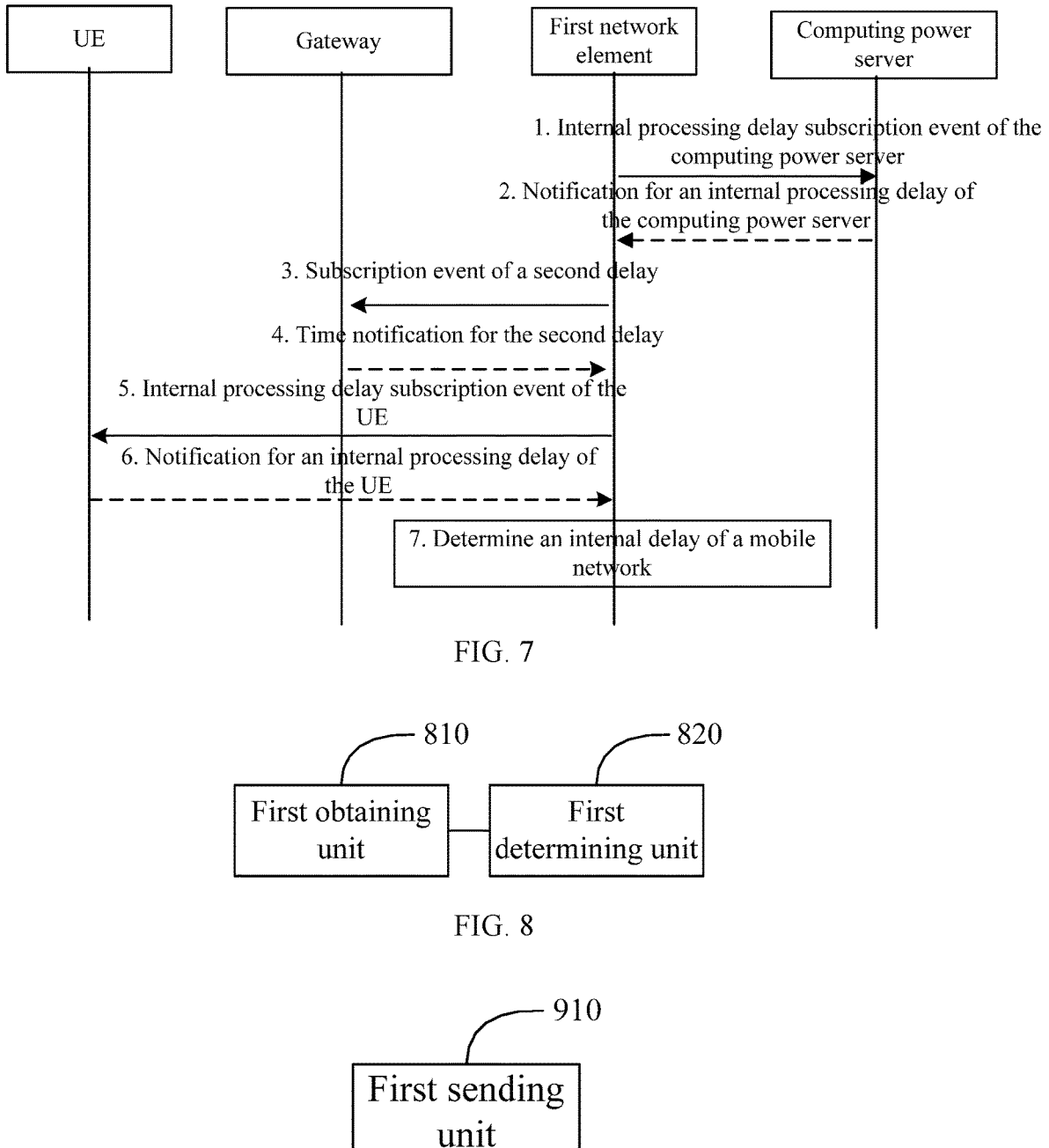
FIG. 7 is a sixth flowchart of a method for determining a transmission delay according to an embodiment of this application.
FIG. 8 is a first schematic structural diagram of an apparatus for determining a transmission delay according to an embodiment of this application.
FIG. 9 is a second schematic structural diagram of an apparatus for determining a transmission delay according to an embodiment of this application.

FIG. 7 is a sixth schematic flowchart of a method for determining a transmission delay according to an embodiment of this application. As shown in FIG. 7, the method includes the following steps:

Step 1: A first network element sends an internal processing delay subscription event of a computing power server to the computing power server, where the internal processing delay subscription event of the server includes: an internal processing delay of the server being changed, a processing resource for a service or computing power task being changed, or the server being changed.

Step 2: When the internal processing delay of the server changes, or when the processing resource for a service or computing power task is changed, or when the server is changed, the computing power server sends a new internal processing delay of the computing power server or a new processing resource of the computing power server to the first network element.

Step 7: The first network element determines a current delay between a terminal and a gateway based on the new internal processing delay of the computing power server that is provided in step 2.

In another embodiment, the method includes the following steps:

Step 3: The first network element sends a delay subscription event between the gateway and the server, and the delay subscription event between the gateway and the server includes: a delay between the gateway and the server being changed or the gateway being changed.

Step 4: When the delay between the gateway and the server is changed or the gateway is changed, send a new delay to the first network element.

Step 7: The first network element determines the current delay between the terminal and the gateway based on the new second delay provided in step 4.

In another embodiment, the method includes the following steps:

Step 5: The first network element sends an internal processing delay subscription event of UE to the UE, and the internal processing delay subscription event of the UE includes: an internal processing delay of the UE being changed.

Step 6: When the internal processing delay of the UE is changed, the UE sends a new internal processing delay of the UE to the first network element.

Step 7: The first network element determines the current delay between the terminal and the gateway based on the new internal processing delay of the UE that is provided in step 6.

It should be noted that the method for determining a transmission delay provided in the embodiments of this application may be performed by an apparatus for determining a transmission delay, or a control module that is in the apparatus for determining a transmission delay and that is configured to perform the method for determining a transmission delay. In the embodiments of this application, that the apparatus for determining a transmission delay performs the method for determining a transmission delay is used as an example to describe the apparatus for determining a transmission delay provided in the embodiments of this application.

FIG. 8 is a first schematic structural diagram of an apparatus for determining a transmission delay according to an embodiment of this application. The apparatus is applied to a first communications device. The apparatus for determining a transmission delay includes a first obtaining unit 810 and a first determining unit 820.

The first obtaining unit 810 is configured to obtain first information.

The first determining unit 820 is configured to determine a first delay based on the first information.

The first information includes: an internal processing delay of a server or a server processing resource; and the first delay includes: a delay between a terminal and a gateway.

In this embodiment of this application, the internal processing delay of the server or the server processing resource are obtained, and the delay between the terminal and the gateway is determined based on the internal processing delay of the server or the server processing resource, so as to provide policy formulation and resource allocation and scheduling in a mobile communication network, and better satisfy user experience or a computing power task requirement of the UE.

In some embodiments, the apparatus further includes:
a second obtaining unit, configured to obtain second information, where the second information includes at least one of the following:
a total delay for a service or computing power task requirement;
an internal processing delay of a terminal; or
a delay between a gateway and a server.

In some embodiments, the first determining unit is configured to:
determine the first delay based on the second information and the first information.

In some embodiments, the first obtaining unit is configured to:
send a first request, where the first request is used to request the internal processing delay of the server or the server processing resource; and
receive a response message for the first request, where the response message for the first request includes: the internal processing delay of the server or the server processing resource, where
the first request includes at least one of the following:
a terminal identifier;
an identifier of either a service or computing power task;
description information of either a service or computing power task; or
description information of a resource required for either a service or computing power task.

In some embodiments, the first request further includes: an internal processing delay subscription event of the server, and the internal processing delay subscription event of the server includes at least one of the following:
the internal processing delay of the server being changed;
a processing resource for a service or computing power task being changed;
a reporting threshold for the internal processing delay of the server;
a reporting time period for the internal processing delay of the server; or
the server being changed.

In some embodiments, when the first information includes the server processing resource, the internal processing delay of the server is determined based on the server processing resource.

In some embodiments, when the second information includes the internal processing delay of the terminal, the second obtaining unit is configured to:
send a second request, where the second request is used to obtain the internal processing delay of the terminal; and
receive a response message for the second request, where the response message for the second request includes the internal processing delay of the terminal.
The second request includes one of the following:
a terminal identifier;
a protocol data unit PDU session identifier; or
an identifier of either a service or computing power task.
In some embodiments, the second request further includes: an internal processing delay subscription event of the terminal, and the internal processing delay subscription event of the terminal includes at least one of the following:
the internal processing delay of the terminal being changed;
a reporting threshold for the internal processing delay of the terminal; or
a reporting time period for the internal processing delay of the terminal.

In some embodiments, when the second information includes the delay between the gateway and the server, the second obtaining unit is configured to:
send a third request, where the third request is used to request the delay between the gateway and the server; and
receive a response message for the third request, where the response message for the third request includes the delay between the gateway and the server, where
the third request includes one of the following:
a terminal identifier;
a PDU session identifier; or
an identifier of either a service or computing power task.
In some embodiments, the third request further includes:
a delay subscription event between the gateway and the server, where the delay subscription event between the gateway and the server includes at least one of the following:
the delay between the gateway and the server being changed;
a reporting threshold for the delay between the gateway and the server;
a reporting time period for the delay between the gateway and the server; or
the gateway being changed.

The apparatus for determining a transmission delay in this embodiment of this application may be an apparatus or an electronic device having an operating system, or may be a component, an integrated circuit, or a chip in a terminal. The electronic device may be a mobile electronic device, or may be a non-mobile electronic device. For example, the mobile electronic device may include but is not limited to the foregoing listed types of terminals 11. The non-mobile electronic device may be a server, a Network Attached Storage (NAS), a personal computer (PC), a television (TV), a teller machine, or a self-service machine. This is not specifically limited in this embodiment of this application.

The apparatus for determining a transmission delay provided in this embodiment of this application can implement the processes implemented in the method embodiments in FIG. 2, FIG. 6, and FIG. 7, and achieve a same technical effect. To avoid repetition, details are not described herein again.

FIG. 9 is a second schematic structural diagram of an apparatus for determining a transmission delay according to an embodiment of this application. The apparatus is applied to a server. The apparatus for determining a transmission delay includes:
a first sending unit 910, configured to send first information, where the first information includes: an internal processing delay of a server or a server processing resource.
In some embodiments, the apparatus further includes:
a first receiving unit, configured to receive a first request, where the first request is used to obtain the internal processing delay of the server or the server processing resource.
The first request includes at least one of the following:
a terminal identifier;

an identifier of either a service or computing power task;

description information of either a service or computing power task;

description information of a resource required for either a service or computing power task; or an internal processing delay subscription event of the server.

In some embodiments, the internal processing delay subscription event of the server includes at least one of the following:

the internal processing delay of the server being changed;

a processing resource for a service or computing power task being changed;

a reporting threshold for the internal processing delay of the server;

a reporting time period for the internal processing delay of the server; or the server being changed.

In some embodiments, the apparatus further includes:

a second determining unit, configured to determine, based on the internal processing delay subscription event of the server, whether to send the first information.

In this embodiment of this application, the server sends the internal processing delay of the server or the server processing resource to the first communications device, and then the first communications device may determine the delay between the terminal and the gateway based on the internal processing delay of the server, so that a corresponding policy is formulated or corresponding resources is allocated to satisfy a required delay requirement, improve UE user experience, and better satisfy a computing power task requirement.

The apparatus for determining a transmission delay in this embodiment of this application may be an apparatus or an electronic device having an operating system, or may be a component, an integrated circuit, or a chip in a terminal. The electronic device may be a mobile electronic device, or may be a non-mobile electronic device. For example, the mobile electronic device may include but is not limited to the foregoing listed types of terminals 11. The non-mobile electronic device may be a server, a Network Attached Storage (NAS), a personal computer (PC), a TV, a teller machine, or a self-service machine. This is not specifically limited in this embodiment of this application.

The apparatus for determining a transmission delay provided in this embodiment of this application can implement the processes implemented in the method embodiments in FIG. 3, FIG. 6, and FIG. 7, and achieve a same technical effect. To avoid repetition, details are not described herein again.

Figures 10, 11, 12:
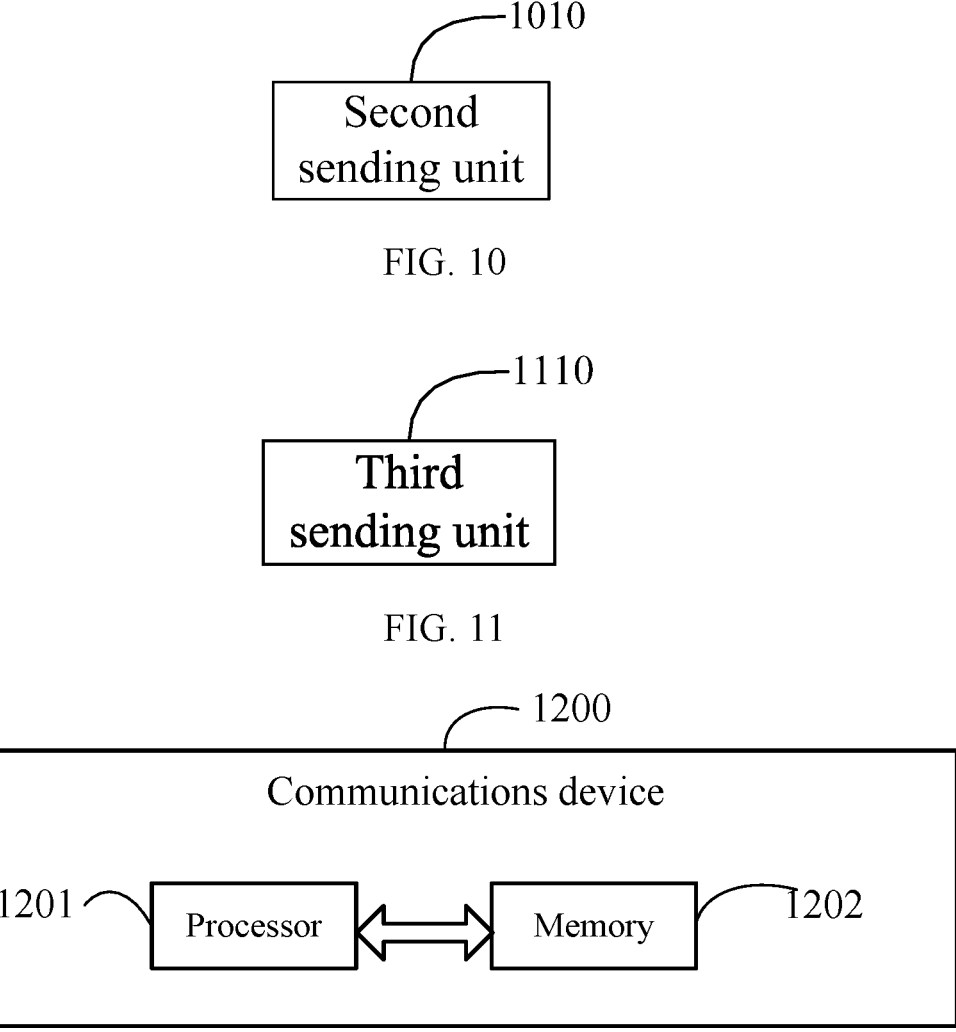
FIG. 10 is a third schematic structural diagram of an apparatus for determining a transmission delay according to an embodiment of this application.
FIG. 11 is a fourth schematic structural diagram of an apparatus for determining a transmission delay according to an embodiment of this application.
FIG. 12 is a schematic structural diagram of a communications device according to an embodiment of this application.

FIG. 10 is a third schematic structural diagram of an apparatus for determining a transmission delay according to an embodiment of this application. The apparatus is applied to a terminal. The apparatus for determining a transmission delay includes:

a second sending unit 1010, configured to send an internal processing delay of a terminal.

In some embodiments, the apparatus further includes:

a second receiving unit, configured to receive a second request, where the second request is used to obtain the internal processing delay of the terminal.

The second request includes one of the following:

a terminal identifier;

a protocol data unit (PDU) session identifier;

an identifier of either a service or computing power task; or an internal processing delay subscription event of the terminal.

In some embodiments, the internal processing delay subscription event of the terminal includes at least one of the following:

the internal processing delay of the terminal being changed;

a reporting threshold for the internal processing delay of the terminal; or a reporting time period for the internal processing delay of the terminal.

In some embodiments, the apparatus further includes:

a third determining unit, configured to determine, based on the internal processing delay subscription event of the terminal, whether to send the internal processing delay of the terminal.

In this embodiment of this application, the terminal sends the internal processing delay of the terminal to the first communications device according to the second request, and then the first communications device may determine the delay between the terminal and the gateway based on the internal processing delay of the terminal, so that a corresponding policy is formulated or corresponding resources is allocated to satisfy a required delay requirement, improve UE user experience, and better satisfy a computing power task requirement.

The apparatus for determining a transmission delay in this embodiment of this application may be an apparatus or an electronic device having an operating system, or may be a component, an integrated circuit, or a chip in a terminal. The electronic device may be a mobile electronic device, or may be a non-mobile electronic device. For example, the mobile electronic device may include but is not limited to the foregoing listed types of terminals 11. The non-mobile electronic device may be a server, a Network Attached Storage (NAS), a personal computer (PC), a television (TV), a teller machine, or a self-service machine. This is not specifically limited in this embodiment of this application.

The apparatus for determining a transmission delay provided in this embodiment of this application can implement the processes implemented in the method embodiments in FIG. 4, FIG. 6, and FIG. 7, and achieve a same technical effect. To avoid repetition, details are not described herein again.

FIG. 11 is a fourth schematic structural diagram of an apparatus for determining a transmission delay according to an embodiment of this application. The apparatus is applied to a gateway. The apparatus for determining a transmission delay includes:

a third sending unit 1110, configured to send a delay between a gateway and a server.

In some embodiments, before the delay between the gateway and the server is sent, the apparatus further includes:

a third receiving unit, configured to receive a third request, where the third request is used to request the delay between the gateway and the server.

The third request includes one of the following:

a terminal identifier;

a protocol data unit (PDU) session identifier;

an identifier of either a service or computing power task; or a delay subscription event between the gateway and the server.

In some embodiments, the delay subscription event between the gateway and the server includes at least one of the following:

the delay between the gateway and the server being changed;

a reporting threshold for the delay between the gateway and the server;

a reporting time period for the delay between the gateway and the server; or the gateway being changed.

In some embodiments, the apparatus further includes:

a fourth determining unit, configured to determine, based on the delay subscription event between the gateway and the server, whether to send the delay between the gateway and the server.

In this embodiment of this application, the gateway sends the delay between the gateway and the server to the first communications device, and then the first communications device may determine the delay between the terminal and the gateway based on the delay between the gateway and the server, so that a corresponding policy may be formulated or corresponding resources may be allocated to satisfy a required delay requirement, improve UE user experience, and better satisfy a computing power task requirement.

The apparatus for determining a transmission delay in this embodiment of this application may be an apparatus or an electronic device having an operating system, or may be a component, an integrated circuit, or a chip in a terminal. The electronic device may be a mobile electronic device, or may be a non-mobile electronic device. For example, the mobile electronic device may include but is not limited to the foregoing listed types of terminals 11. The non-mobile electronic device may be a server, a Network Attached Storage (NAS), a personal computer (PC), a television (TV), a teller machine, or a self-service machine. This is not specifically limited in this embodiment of this application.

The apparatus for determining a transmission delay provided in this embodiment of this application can implement the processes implemented in the method embodiments in FIG. 5, FIG. 6, and FIG. 7, and achieve a same technical effect. To avoid repetition, details are not described herein again.

In some embodiments, as shown in FIG. 12, this application further provides a communications device 1200, including a processor 1201, a memory 1202, and a program or an instruction that is stored in the memory 1202 and that can be run on the processor 1201. For example, when the communications device 1200 is a terminal, the program or the instruction is executed by the processor 1201 to implement the processes of the foregoing method for determining a transmission delay embodiment, and a same technical effect can be achieved. When the communications device 1200 is a network side device, the program or the instruction is executed by the processor 1201 to implement the processes of the foregoing method for determining a transmission delay embodiment, and a same technical effect can be achieved. To avoid repetition, details are not described herein again.

Figure 13:
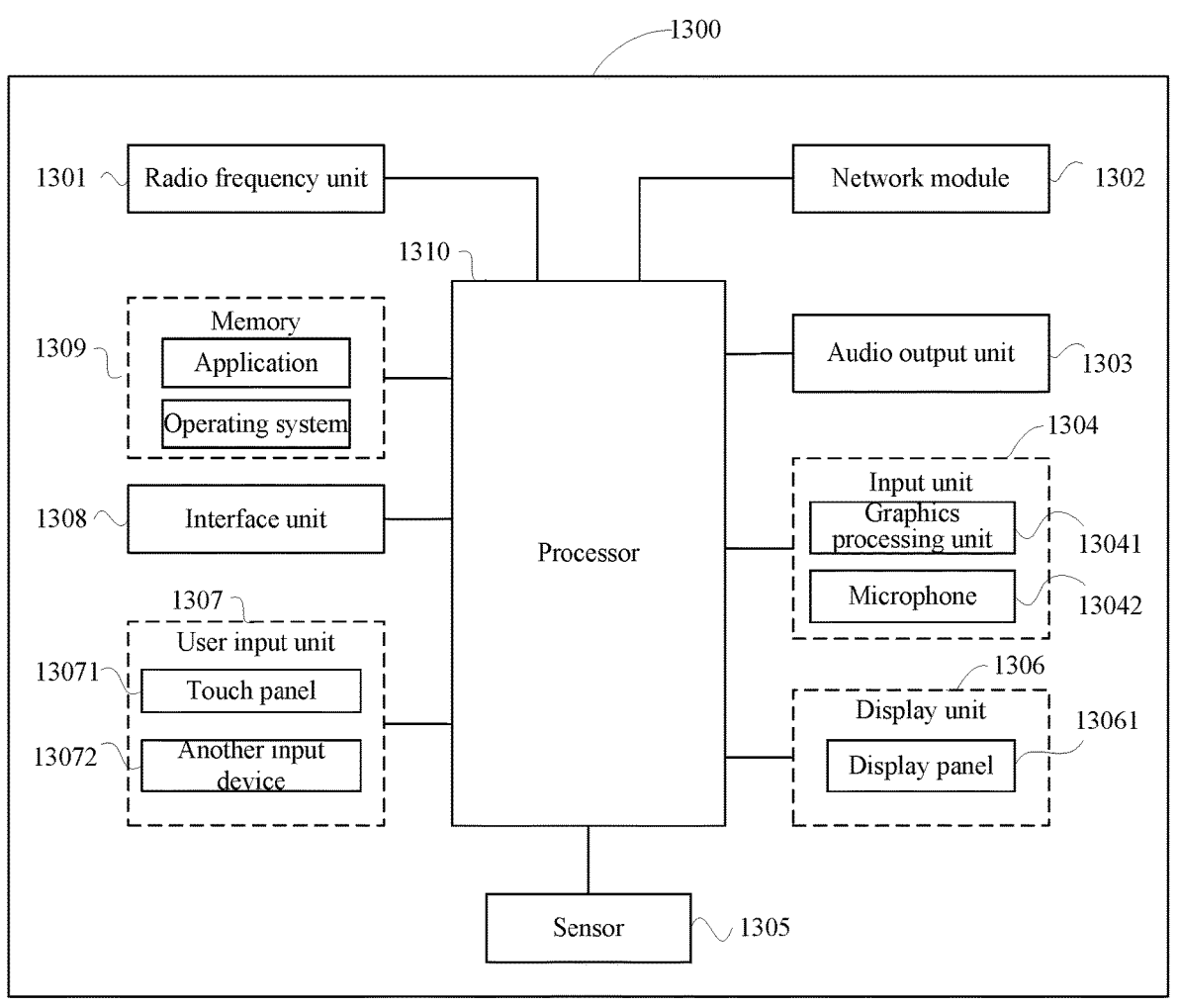
FIG. 13 is a schematic diagram of a hardware structure of a terminal according to an embodiment of this application.

FIG. 13 is a schematic diagram of a hardware structure of a terminal according to an embodiment of this application.

The terminal 1300 includes but is not limited to components such as a radio frequency unit 1301, a network module 1302, an audio output unit 1303, an input unit 1304, a sensor 1305, a display unit 1306, a user input unit 1307, an interface unit 1308, a memory 1309, and a processor 1310.

A person skilled in the art can understand that the terminal 1300 may further include a power supply (such as a battery) that supplies power to each component. The power supply may be logically connected to the processor 1310 by using a power supply management system, to implement functions such as charging and discharging management, and power consumption management by using the power supply management system. The terminal structure shown in FIG. 13 constitutes no limitation on the terminal, and the terminal may include more or fewer components than those shown in the figure, or combine some components, or have different component arrangements. Details are not described herein.

It should be understood that, in the embodiments of this application, the input unit 1304 may include a Graphics Processing Unit (GPU) 13041 and a microphone 13042, and the graphics processing unit 13041 processes image data of a still picture or video obtained by an image capture apparatus (such as a camera) in a video capture mode or an image capture mode. The display unit 1306 may include a display panel 13061. The display panel 13061 may be configured in a form such as a liquid crystal display or an organic light-emitting diode. The user input unit 1307 includes a touch panel 13071 and another input device 13072. The touch panel 13071 is also referred to as a touchscreen. The touch panel 13071 may include two parts: a touch detection apparatus and a touch controller. The another input device 13072 may include but is not limited to a physical keyboard, a functional button (such as a volume control button or a power on/off button), a trackball, a mouse, and a joystick. Details are not described herein.

In this embodiment of this application, the radio frequency unit 1301 receives downlink data from a network side device and then sends the downlink data to the processor 1310 for processing; and sends uplink data to the network side device. Usually, the radio frequency unit 1301 includes but is not limited to an antenna, at least one amplifier, a transceiver, a coupler, a low noise amplifier, a duplexer, and the like.

The memory 1309 may be configured to store a software program or an instruction and various data. The memory 1309 may mainly include a program or instruction storage area and a data storage area. The program or instruction storage area may store an operating system, and an application or an instruction required by at least one function (for example, a sound playing function or an image playing function). In addition, the memory 1309 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 1310 may include one or more processing units. In some embodiments, an application processor and a modem processor may be integrated into the processor 1310. The application processor mainly processes an operating system, a user interface, an application, an instruction, or the like. The modem processor mainly processes wireless communications, for example, a baseband processor. It can be understood that, the modem processor may not be integrated into the processor 1310.

The radio frequency unit 1301 is configured to send an internal processing delay of a terminal.

In this embodiment of this application, the terminal directly sends the internal processing delay of the terminal to the first communications device according to the second request, and then the first communications device may determine the delay between the terminal and the gateway based on the internal processing delay of the terminal, so that a corresponding policy is formulated or corresponding resources is allocated to satisfy a required delay requirement, improve UE user experience, and better satisfy a computing power task requirement.

In some embodiments, the radio frequency unit 1301 is further configured to receive a second request, where the second request is used to obtain the internal processing delay of the terminal.

The second request includes one of the following:

a terminal identifier;

a protocol data unit (PDU) session identifier;

an identifier of either a service or computing power task; or an internal processing delay subscription event of the terminal.

In some embodiments, the internal processing delay subscription event of the terminal includes at least one of the following:

the internal processing delay of the terminal being changed;

a reporting threshold for the internal processing delay of the terminal; or a reporting time period for the internal processing delay of the terminal.

The processor 1310 is further configured to determine, based on the internal processing delay subscription event of the terminal, whether to send the internal processing delay of the terminal.

In this embodiment of this application, the terminal receives the second request sent by the first communications device, and sends the internal processing delay of the terminal to the first communications device according to the second request, and then the first communications device may determine the delay between the terminal and the gateway based on the internal processing delay of the terminal, so that a corresponding policy is formulated or corresponding resources is allocated to satisfy a required delay requirement, improve UE user experience, and better satisfy a computing power task requirement.

Figure 14:
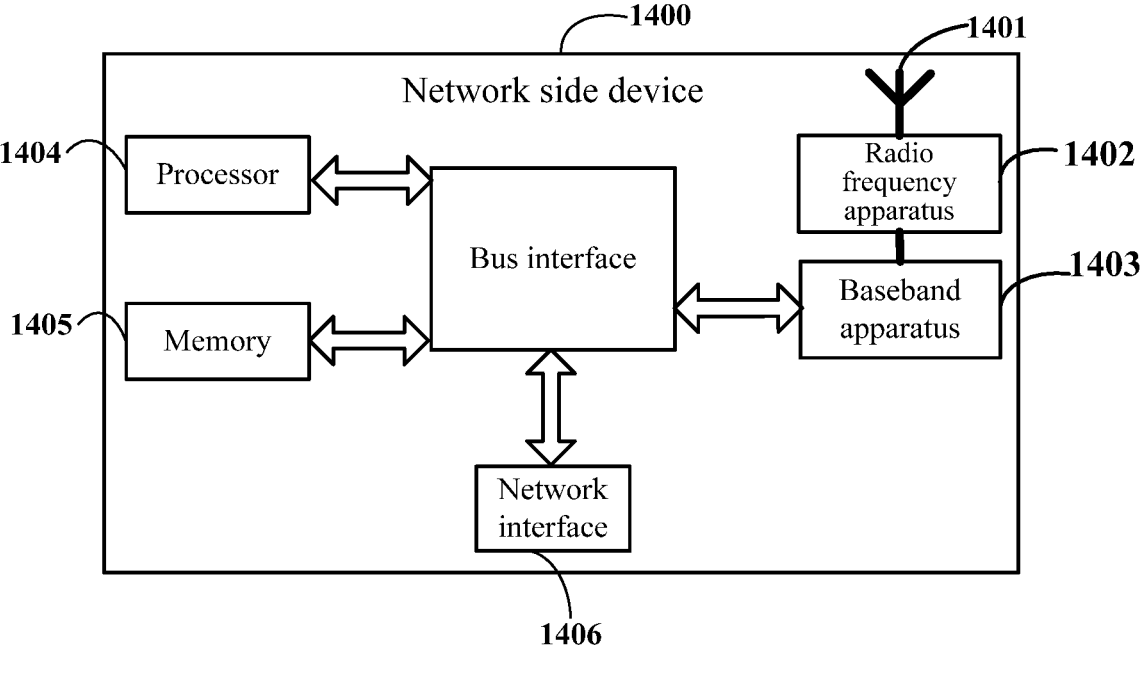
FIG. 14 is a schematic diagram of a hardware structure of a network side device according to an embodiment of this application.

Some embodiments of this application further provide a network side device. As shown in FIG. 14, a network device 1400 includes an antenna 1401, a radio frequency apparatus 1402, and a baseband apparatus 1403. The antenna 1401 is connected to the radio frequency apparatus 1402. In an uplink direction, the radio frequency apparatus 1402 receives information by using the antenna 1401, and sends the received information to the baseband apparatus 1403 for processing. In a downlink direction, the baseband apparatus 1403 processes information to be sent and sends processed information to the radio frequency apparatus 1402, and the radio frequency apparatus 1402 processes the received information and sends processed information through the antenna 1401.

The foregoing band processing apparatus may be located in the baseband apparatus 1403. In the foregoing embodiment, a method performed by the network side device may be implemented in the baseband apparatus 1403. The baseband apparatus 1403 includes a processor 1404 and a memory 1405.

The baseband apparatus 1403 may include, for example, at least one baseband board, where a plurality of chips are disposed on the baseband board. As shown in FIG. 14, one chip is, for example, the processor 1404, which is connected to the memory 1405, so as to invoke a program in the memory 1405 to perform operations of the network device shown in the foregoing method embodiment.

The baseband apparatus 1403 may further include a network interface 1406, configured to exchange information with the radio frequency apparatus 1402. For example, the interface is a common public radio interface (CPRI).

In some embodiments, the network side device further includes an instruction or a program stored in the memory 1405 and that can be run on the processor 1404. The processor 1404 invokes the instruction or the program in the memory 1405 to perform the method performed by the modules shown in FIG. 8, FIG. 9, and FIG. 11, and a same technical effect is achieved. To avoid repetition, details are not described herein again.

An embodiment of this application further provides a readable storage medium. The readable storage medium stores a program or an instruction, and when the program or the instruction is executed by a processor, the processes of the foregoing method for determining a transmission delay embodiment are implemented and a same technical effect can be achieved. To avoid repetition, details are not described herein again.

The processor is the processor in the terminal described in the above embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing method for determining a transmission delay embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer software product. The software product is stored in a non-volatile storage medium, and the software product is configured to be executed by at least one processor to implement the processes of the foregoing method embodiment, and a same technical effect can be achieved. To avoid repetition, details are not described herein again.

An embodiment of this application provides a communications device, configured to perform each process in the foregoing method embodiments, and can achieve the same technical effect. To avoid repetition, details are not described herein again.

It should be noted that, in this specification, the terms "include", "including", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

What is claimed is:

1. A method for determining a transmission delay, performed by a communications device, comprising:

obtaining first information, wherein the first information comprises an internal processing delay of a server that is indicative of a processing delay incurred when performing processing using a server processing resource, wherein the internal processing delay of the server is determinable based on the server processing resource; and determining a first delay based on the first information, wherein the first delay is a delay between a terminal and a gateway, wherein both the terminal and the gateway are connected to the server, wherein obtaining the first information comprises:

sending a first request, wherein the first request is used to request the internal processing delay of the server or the server processing resource for determining the internal processing delay of the server; and receiving a response message for the first request, wherein the response message for the first request comprises: the internal processing delay of the server or the server processing resource for determining the internal processing delay of the server.

2. The method according to claim 1, further comprising:

obtaining second information, wherein the second information comprises at least one of the following:

a total delay for a service or a computing power task requirement;

an internal processing delay of the terminal; or a delay between the gateway and the server.

3. The method according to claim 2, wherein determining the first delay based on the first information comprises:

determining the first delay based on the second information and the first information.

4. The method according to claim 2, wherein the obtaining second information comprises:

sending a second request, wherein the second request is used to obtain the internal processing delay of the terminal; and receiving a response message for the second request, wherein the response message for the second request comprises the internal processing delay of the terminal, wherein the second request comprises one of the following:

a terminal identifier;

a protocol data unit (PDU) session identifier; or an identifier of either the service or the computing power task.

5. The method according to claim 4, wherein the second request further comprises: an internal processing delay subscription event of the terminal, and the internal processing delay subscription event of the terminal comprises at least one of the following:

changing of the internal processing delay of the terminal;

a reporting threshold for the internal processing delay of the terminal; or a reporting time period for the internal processing delay of the terminal.

6. The method according to claim 2, wherein when the second information comprises the delay between the gateway and the server, obtaining the second information comprises:

sending a third request, wherein the third request is used to request the delay between the gateway and the server; and receiving a response message for the third request, wherein the response message for the third request comprises the delay between the gateway and the server, wherein the third request comprises one of the following:

a terminal identifier;

a PDU session identifier; or an identifier of either a service or computing power task.

7. The method according to claim 6, wherein the third request further comprises:

a delay subscription event between the gateway and the server, wherein the delay subscription event between the gateway and the server comprises at least one of the following:

changing of the delay between the gateway and the server;

a reporting threshold for the delay between the gateway and the server;

a reporting time period for the delay between the gateway and the server; or changing of the gateway.

8. The method according to claim 1, wherein the first request comprises at least one of the following:

a terminal identifier;

an identifier of either a service or computing power task;

description information of either a service or computing power task; or description information of a resource required for either a service or computing power task.

9. The method according to claim 8, wherein the first request further comprises: an internal processing delay subscription event of the server, and the internal processing delay subscription event of the server comprises at least one of the following:

changing of the internal processing delay of the server;

changing of a processing resource for a service or computing power task;

a reporting threshold for the internal processing delay of the server;

a reporting time period for the internal processing delay of the server; or changing of the server.

10. The method according to claim 1, wherein the first information further comprises the server processing resource, and the internal processing delay of the server is determined based on the server processing resource.

11. A method for determining a transmission delay, performed by a server, comprising:

receiving a first request, wherein the first request is used to obtain an internal processing delay of the server that is indicative of a processing delay incurred when performing processing using a server processing resource, wherein the internal processing delay of the processing is determinable based on the server processing resource;

sending first information, wherein the first information comprises: the internal processing delay of the server or the server processing resource for determining the internal processing delay of the server, and the first information is configured for determining a delay between a terminal and a gateway, wherein both the terminal and the gateway are connected to the server, wherein sending the first information comprises:

sending a response message for the first request, wherein the response message for the first request comprises: the internal processing delay of the server or the server processing resource for determining the internal processing delay of the server.

12. The method according to claim 11, wherein the first request comprises at least one of the following:

a terminal identifier;

an identifier of either a service or computing power task;

description information of either a service or computing power task;

description information of a resource required for either a service or computing power task; or an internal processing delay subscription event of the server.

13. The method according to claim 12, wherein the internal processing delay subscription event of the server comprises at least one of the following:

changing of the internal processing delay of the server;

changing of a processing resource for a service or computing power task;

a reporting threshold for the internal processing delay of the server;

a reporting time period for the internal processing delay of the server; or changing of the server.

14. The method according to claim 12, wherein before sending the first information, further comprising:

determining, based on the internal processing delay subscription event of the server, whether to send the first information.

15. A communications device, comprising a processor, a memory, and a program or an instruction that is stored in the memory and that can be run on the processor, wherein when the program or the instruction is executed by the processor, the steps of the method for determining a transmission delay according to claim 1 are implemented.

16. A server, comprising a processor, a memory, and a program or an instruction that is stored in the memory and that can be run on the processor, wherein when the program or the instruction is executed by the processor, the steps of the method for determining a transmission delay according to claim 11 are implemented.

* * * * *